US010454911B2

(12) United States Patent
Hanhirova (10) Patent No.: US 10,454,911 B2
(45) Date of Patent: Oct. 22, 2019

(54) INTEGRATED INTRANET WORKSPACE

(71) Applicant: Happeo Oy, Helsinki (FI)

(72) Inventor: Antero Hanhirova, Helsinki (FI)

(73) Assignee: Happeo Oy (FI)

( * ) Notice: Subject to any disclaimer, the term of this patent is extended or adjusted under 35 U.S.C. 154(b) by 602 days.

(21) Appl. No.: 15/166,870

(22) Filed: May 27, 2016

(65) Prior Publication Data

US 2017/0346862 A1    Nov. 30, 2017

(51) Int. Cl.
*H04L 29/06* (2006.01)
*G06F 3/0482* (2013.01)
*G06F 3/0484* (2013.01)
*G06F 16/958* (2019.01)

(52) U.S. Cl.
CPC ............ *H04L 63/08* (2013.01); *G06F 3/0482* (2013.01); *G06F 3/0484* (2013.01); *G06F 16/958* (2019.01); *H04L 63/102* (2013.01)

(58) Field of Classification Search
CPC ... H04L 65/4015; H04L 63/08; H04L 63/102; G06F 3/0482; G06F 3/0484; G06F 17/3089
See application file for complete search history.

(56) References Cited

U.S. PATENT DOCUMENTS

| | | | | |
|---|---|---|---|---|
| 7,698,160 B2* | 4/2010 | Beaven | ............... | G06Q 10/0633 705/26.1 |
| 8,082,301 B2* | 12/2011 | Ahlgren | ................... | G06F 9/468 709/204 |
| 8,095,594 B2* | 1/2012 | Beaven | ............... | G06Q 10/0633 709/204 |
| 8,904,181 B1* | 12/2014 | Felsher | ................. | H04L 9/0825 380/282 |
| 8,935,429 B2* | 1/2015 | Wilkinson | .............. | G06F 9/468 709/245 |
| 9,344,466 B1* | 5/2016 | Abuzalaf | ............ | H04L 65/4015 |
| 9,613,190 B2* | 4/2017 | Ford | ....................... | G06F 21/10 |
| 9,916,434 B2* | 3/2018 | de Luna | .................. | G06F 21/32 |
| 2003/0126137 A1* | 7/2003 | McFadden | ........ | G06F 17/30604 |
| 2004/0186762 A1* | 9/2004 | Beaven | .............. | G06Q 10/0633 705/7.27 |

(Continued)

*Primary Examiner* — Sharon S Lynch
(74) *Attorney, Agent, or Firm* — Waller Lansden Dortch & Davis LLP; Blake M. Bernard (57) ABSTRACT

A method, a system and a non-transitory memory including a computer readable instructions is disclosed for providing an integrated intranet workspace. One or more independent applications are selected as workspace integrated applications for providing services within the integrated intranet workspace. The independent applications reside in a cloud computing environment. One or more users are selected into a defined set of users authorized to access the integrated intranet workspace. Each user in the defined set of users, is provided with an integrated intranet web client for providing a user interface with a combined view into at least part of the workspace integrated applications. The integrated intranet web client is configured to manage authentication of a user among the defined set of users to the at least part of the workspace integrated applications. Integrated intranet user information is configured to authorize the integrated intranet web clients to access the integrated intranet workspace.

18 Claims, 7 Drawing Sheets

(56) References Cited

U.S. PATENT DOCUMENTS

| | | | |
|---|---|---|---|
| 2005/0004978 A1* | 1/2005 | Reed | G06Q 30/0601 709/203 |
| 2005/0055306 A1* | 3/2005 | Miller | G06Q 10/10 705/37 |
| 2005/0159969 A1* | 7/2005 | Sheppard | G06Q 10/00 705/7.36 |
| 2007/0255712 A1* | 11/2007 | Mahoney | G06F 17/30194 |
| 2008/0052358 A1* | 2/2008 | Beaven | G06Q 10/0633 709/205 |
| 2011/0004621 A1* | 1/2011 | Kelley | G06Q 10/06 707/769 |
| 2011/0276914 A1* | 11/2011 | Ahlgren | G06F 9/468 715/771 |
| 2012/0096365 A1* | 4/2012 | Wilkinson | G06F 9/468 715/740 |
| 2013/0212250 A1* | 8/2013 | Kleppner | G06Q 10/10 709/224 |
| 2013/0218829 A1* | 8/2013 | Martinez | G06F 21/6272 707/608 |
| 2013/0254699 A1* | 9/2013 | Bashir | G06F 3/0481 715/772 |
| 2013/0318347 A1* | 11/2013 | Moffat | H04L 63/08 713/168 |
| 2014/0046978 A1* | 2/2014 | Krishnaprasad | G06F 17/30427 707/781 |
| 2014/0067995 A1* | 3/2014 | Schachtel | G06Q 10/0631 709/217 |
| 2014/0298207 A1* | 10/2014 | Ittah | G06Q 10/00 715/753 |
| 2014/0304836 A1* | 10/2014 | Velamoor | G06F 21/6209 726/28 |
| 2014/0372536 A1* | 12/2014 | Ahlgren | G06F 9/468 709/205 |
| 2015/0127628 A1* | 5/2015 | Rathod | H04W 4/21 707/710 |
| 2015/0135300 A1* | 5/2015 | Ford | H04L 67/1097 726/11 |
| 2016/0314291 A1* | 10/2016 | de Luna | G06F 21/32 |
| 2016/0352812 A1* | 12/2016 | Ahlgren | G06F 9/468 |
| 2016/0378291 A1* | 12/2016 | Pokrzywka | G06F 3/0488 715/751 |
| 2017/0142076 A1* | 5/2017 | Ford | G06F 21/10 |
| 2018/0278602 A1* | 9/2018 | Koushik | H04L 63/0807 |
| 2018/0309807 A1* | 10/2018 | Smith | H04L 65/403 |

* cited by examiner

INTEGRATED INTRANET WORKSPACE

BACKGROUND

Field

The present invention relates to a method for providing a collaboration workspace for a number of users and especially to an integrated intranet workspace as defined herein. The present invention further relates to a system for providing a collaboration workspace for a number of users and more particularly to a system for providing an integrated intranet workspace as defined herein.

Description of the Related Art

Intranet is defined as a private network, typically accessible only to an organization's staff. Intranet may constitute an important focal point for internal communication and collaboration. Such organizational limitation may be based on web domain of the users.

In modern society, multi-party collaboration is often utilized, where participants belong to multiple organizations. In such collaboration environment, organizational limitation of a traditional intranet creates obstacles for fruitful collaboration among participants. A multi-organizational collaboration would equally well benefit from a common communication workspace for participants, and a focal point for collaboration-wide communication.

US patent publication U.S. Pat. No. 8,332,470 presents a system providing collaborative access to applications from a collaborative workspace. This system utilizes a server which includes workspace specific application containers for each application used in the collaborative workspace for storing content related to the workspace.

A problem relating to such conventional workspace solution is that although the applications are independent from each other, system is dependent on a server unit managing centrally the collaborative access to defined applications on behalf of the users and storing workspace data related to the applications in the application containers, which features restrict scalability of the system. Further, collaborative access is provided to the users on behalf of the users so that the collaboration manager acts always as a party in communication between the application and the user. An improved solution is needed that avoids use of a common server for providing access to the common workspace, related applications and collaborative user and application data.

SUMMARY

An object of the present invention is to provide a method and system so as to overcome at least some of the prior art disadvantages.

Embodiments of the invention are disclosed in the dependent claims.

According to a first aspect, method for providing an integrated intranet workspace is provided. The method comprises including one or more independent applications as workspace integrated applications for providing services within the integrated intranet workspace. The independent applications reside in a cloud computing environment. The method further comprises authorizing one or more users into a defined set of users authorized to access the integrated intranet workspace and providing, for each user in the defined set of users, an integrated intranet web client for providing a user interface with a combined view into at least part of the workspace integrated applications. Each integrated intranet web client is configured to manage authentication of a user among the defined set of users to the at least part of the workspace integrated applications.

According to a second aspect, the method comprises obtaining, by an integrated intranet feeder, integrated intranet user information related to users residing within a domain of an organization from an organization user management framework. The integrated intranet user information is stored in an integrated intranet database associated with the integrated intranet feeder. At least part of the integrated intranet user information may be provided towards the integrated intranet web clients. The integrated intranet user information is configured to authorize the integrated intranet web clients to access the integrated intranet workspace.

According to a third aspect, the including of the workspace integrated applications is based on a selection made by an integrated intranet workspace user.

According to a fourth aspect, the method further comprises receiving, from a user among the defined set of users, a request to add a new user into the defined set of users authorized to access the integrated intranet workspace, wherein the request includes at least an identifier of the new user, and performing, by the integrated intranet feeder, a process for determining whether the new user may be added into the defined set of users. If the new user may be added based on said determining, the new user is authorized to access the integrated intranet workspace by adding the new user into the defined set of users by storing the identifier of the new user among identifiers of the defined set of users. The user is informed that the new user was added, and a message is sent to the new user, informing the new user about availability of the integrated intranet workspace.

According to a fifth aspect, the method further comprises performing a first search in the integrated intranet database for detecting if the identifier of the new user indicates that the new user resides within the domain of the organization and if integrated intranet data of the new user is already stored in the integrated intranet database. If the first search indicates that the new user resides within the domain of the organization and that the identifier of the new user is already stored in the integrated intranet database, the new user is authorized to access the integrated intranet workspace, the integrated intranet workspace is shared for the new user and at least part of the workspace integrated applications are shared to the new user.

According to a sixth aspect, the new user may be detected to represent a group of users. Then, a check is performed to find out whether the workspace integrated applications are capable of accepting a group type user. In case any of the workspace integrated applications are not capable of accepting a group type user, the group of users may be expanded into a number of individual new users corresponding to the participant of the group of users. The identifiers of the number of individual users of the group of users are stored among the identifiers of the defined set of users and thereby the number of individual users are authorized to access the integrated intranet workspace. Then the at least part of the workspace integrated applications may be shared to each of the number of individual new users.

According to a seventh aspect, the process for determining further comprises performing a first search in the integrated intranet database for detecting if the new user resides within the domain of the organization, detecting in the first search that the new user does not reside within the domain of the organization, and performing a second search among user data of all integrated intranet users within the integrated intranet database for checking whether an identifier of the new user is found in the integrated intranet data stored in the integrated intranet database. If the new user does is not found in the integrated intranet database, the identifier of the new user is stored among identifiers of the defined set of users in the integrated intranet database. The new user is authorized to access the integrated intranet workspace, which causes performing at least one of sharing the integrated intranet workspace for the new user, and sharing the at least part of workspace integrated applications to the new user.

According to an eighth aspect, the method further comprises detecting, that the new user is not within the domain of the organization and comprises a group of users and not adding identity of the new user in the integrated intranet database. A notification is sent to the user that an external group of users may not be added into the integrated intranet workgroup as a group user.

According to a ninth aspect, the organization user management framework is regularly polled by the integrated intranet feeder, for user information related to users residing within the domain of the organization. The polled user information is compared to the integrated intranet user information stored in the integrated intranet database, and the integrated intranet user information in the integrated intranet database is updated whenever the user information received from the organization user management framework is deemed to have changed.

According to a tenth aspect, application data for at least part of the workspace integrated applications for the workgroup is only stored in the cloud computing environment.

According to a further aspect, a non-transitory computer-readable memory containing computer readable instructions is provided which, when executed by at least one data processor, cause a computer device to perform any of the above method steps.

According to an aspect, a system accessible by a computing device is provided. The system is configured to provide an integrated intranet workspace comprising one or more independent applications selected as workspace integrated applications for providing services within the integrated intranet workspace to a defined set of users authorized to access the integrated intranet workspace. The independent applications provide the services in a cloud computing environment. An integrated intranet web client is configured to provide a combined view into at least part of the workspace integrated applications for a user among the defined set of users. The integrated intranet web client is configured to manage authentication of a user among the defined set of users to the at least part of the workspace integrated applications.

According to another aspect, the system further comprises an integrated intranet feeder configured to obtain integrated intranet user information related to users residing within a domain of an organization from an organization user management framework and an integrated intranet database associated with the integrated intranet feeder, the integrated intranet database configured for storing the integrated intranet user information. The integrated intranet feeder is further configured to provide at least part of the integrated intranet user information towards the integrated intranet web clients. The integrated intranet user information is configured to authorize the integrated intranet web clients to access the integrated intranet workspace.

According to a further aspect, the integrated intranet feeder is further configured to receive, from a user among the defined set of users, a request to add a new user into the defined set of users authorized to access the integrated intranet workspace, wherein the request includes at least an identifier of the new user. The integrated intranet feeder is further configured to perform, by the integrated intranet feeder, a process for determining whether the new user may be added into the defined set of users. If the new user may be added, the integrated intranet feeder is configured to authorize the new user to access the integrated intranet workspace by adding the new user into the defined set of users by storing the identifier of the new user among identifiers of the defined set of users. The user is informed that the new user was added, and a message informing the new user about availability of the integrated intranet workspace is sent.

According to another aspect, the workspace integrated applications are configured to be selected by an integrated intranet workspace user.

According to a further aspect, the integrated intranet feeder is further configured to receive, from a user among the defined set of users, a request to add a new user into the defined set of users authorized to access the integrated intranet workspace, wherein the request includes at least an identifier of the new user and to perform, by the integrated intranet feeder, a process for determining whether the new user may be added into the defined set of users. If the new user may be added, the integrated intranet feeder is configured to add the new user into the defined set of users by storing the identifier of the new user among identifiers of the defined set of users, to inform the user that the new user was added, and to send a message informing the new user about availability of the integrated intranet workspace.

According to a yet another aspect, the integrated intranet feeder is further configured to perform a first search in the integrated intranet database for detecting if the identifier of the new user indicates that the new user resides within the domain of the organization and if integrated intranet data of the new user is already stored in the integrated intranet database. If the first search indicates that the new user resides within the domain of the organization and that the identifier of the new user is already stored in the integrated intranet database, the integrated intranet feeder is configured to authorize the new user to access the integrated intranet workspace by storing the identifier of the new user among the identifiers of the defined set of users, to share the integrated intranet workspace for the new user and to share at least part of the workspace integrated applications to the new user.

According to a yet another aspect, the integrated intranet feeder is further configured to detect, that the new user is not within the domain of the organization and comprises a group of users, to not add identity of the new user in the integrated intranet database, and to send a notification to the user that an external group of users may not be added into the integrated intranet workgroup as a group user.

According to a yet further aspect, the integrated intranet feeder is further configured to regularly poll from the organization user management framework for user information related to users residing within the domain of the organization and to compare the polled user information to the integrated intranet user information stored in the integrated intranet database. The integrated intranet feeder is configured to update the integrated intranet user information in the integrated intranet database whenever the user information received from the organization user management framework is deemed to have changed.

According to an aspect, application data for at least part of the workspace integrated applications for the workgroup is configured to be only stored in the cloud computing environment.

A system, a method and a non-transitory memory containing computer executable instructions are presented which are based on an idea of introducing an integrated intranet system including an integrated intranet feeder functionality for providing access to integrated intranet user information, integrated intranet group information and authentication keys for independent integrated intranet web clients for accessing independent applications integrated into the workspace, but where users may be authenticated directly from the web client with the workspace integrated applications, and where only minimal amount of application data related to selected application(s) is necessarily stored in the integrated intranet system itself providing the shared workspace. Most application user data is stored only in a cloud based storage provided by the workspace integrated applications, which are provided through a cloud computing environment. Thus, the system requires no physical or virtual servers for serving applications in the integrated intranet workspace, but all functionality of the integrated intranet system may be provided as cloud computing services using for instance application engine solution such as Google App Engine®. Using cloud computing environment and cloud based applications in the workspace makes the system beneficially highly scalable, and allows authorization for access to the workspace over the internet even to users who do not reside within a web domain owned by a single organization. We may use term application for referring to any applications or services used within the integrated intranet as workspace integrated applications. Further, term application preferably refers to a cloud application available in a cloud computing environment.

Compared to traditional, organization limited intranet based collaboration solutions, embodiments of the disclosed system and method have an advantage that the integrated intranet also allows including users into a group of defined users of the workspace, who reside outside the organization domain with similar rights and capabilities to users residing within the organization domain. This is enabled by utilizing only such workspace integrated applications that are available for any users in a cloud computing environment. Thus, there is no need for allowing access to any physical organization internal network to any organization external users in order to enable collaboration. In other words, embodiments of the invention enable a collaborative intranet type workspace which is available for collaboration for both users within a company web domain and even users residing outside a company web domain. Role of each user in a workspace can be defined according to a hierarchy and each user is identified with their personal credentials, so that security of the shared workspace and shared data therein can be ensured.

BRIEF DESCRIPTION OF THE DRAWINGS

In the following the invention will be described in greater detail, in connection with preferred embodiments, with reference to the attached drawings, in which.

DETAILED DESCRIPTION

The following embodiments are exemplary only. Although the specification may refer to "an", "one", or "some" embodiment(s), this does not necessarily mean that each such reference is to the same embodiment(s), or that the feature only applies to a single embodiment. Single features of different embodiments may be combined to provide further embodiments.

In the following, features of the invention will be described with an example of a system architecture in which various embodiments of the invention may be implemented. Only elements relevant for illustrating the embodiments are described. Various implementations of the information system include elements that are suitable for the example embodiments and may not be specifically described herein.

Figure 1:
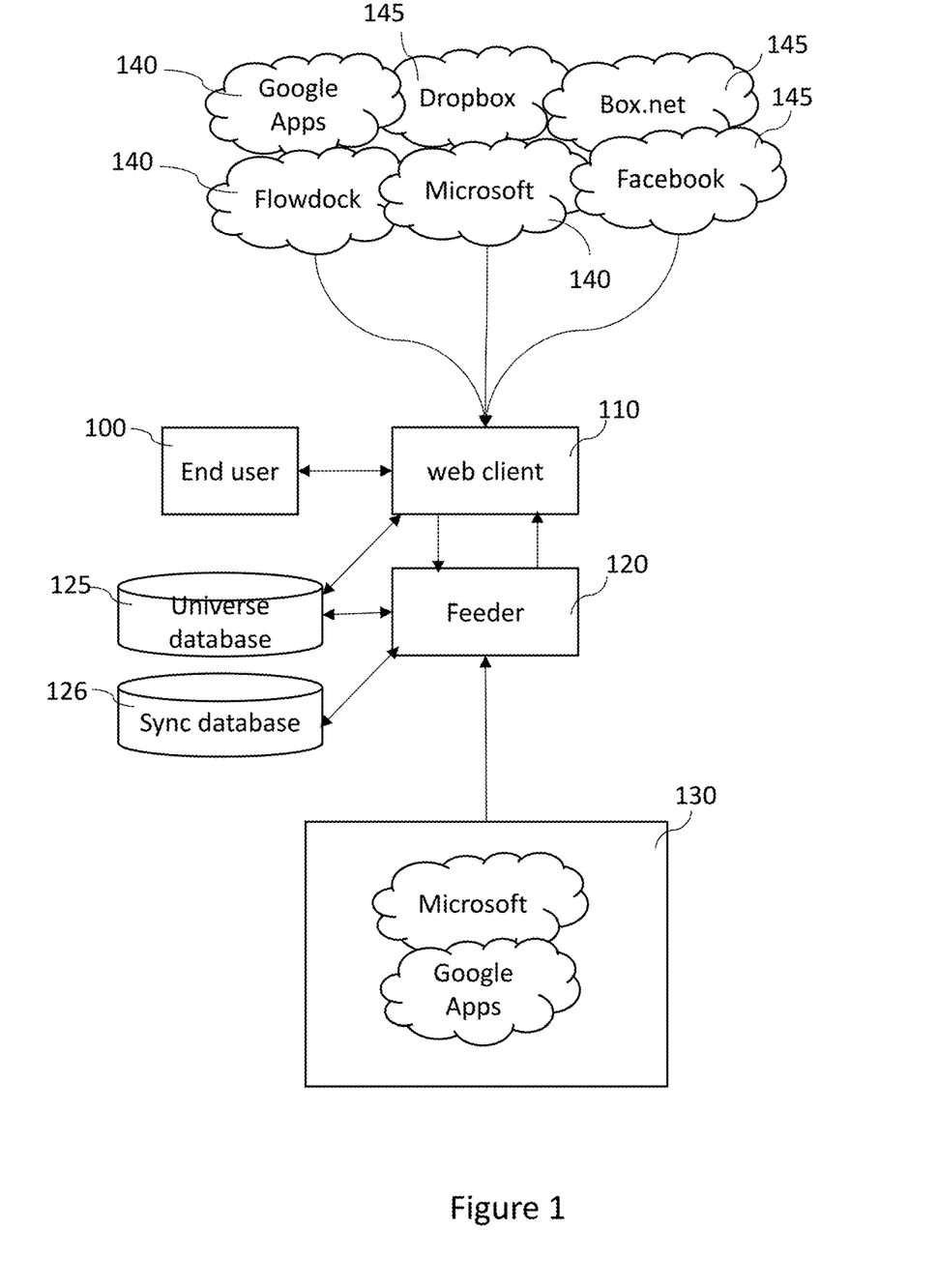
FIG. 1 is a general schematic of an integrated intranet system.

FIG. 1 illustrates a general schematic view of an integrated intranet system. End user (100) has access to the integrated intranet workspace through an integrated intranet web client (110). Although FIG. 1 shows just a single end user (100), it should be understood that any number of end users (100) may be using the scalable integrated intranet system, each end user (100) using an own instance of an integrated intranet web client (110) to access the integrated intranet.

Integrated intranet web clients (110) may communicate with an integrated intranet feeder (120), which performs at least user management for the integrated intranet system. The integrated intranet feeder (120) obtains organization related user data from the organization user management framework (130) and stores information on which users belong to which integrated intranet workgroup in the integrated intranet database (125). The integrated intranet feeder (120) obtains organization internal authorization information including organization wide user authorization information, user management and user provisioning information and also authentication keys for these users. With the authentication keys, the integrated intranet feeder (120) may impersonate users resident within the organization network and facilitate seamless application authentication and provisioning for the integrated intranet workspace users (100) in the integrated applications. Authentication keys are coupled to a specific user identity in the integrated intranet system, and same authentication keys may be used for different workspaces.

When the integrated intranet system is taken into use in an organization, administrators of the organization may authorize the integrated intranet feeder (120) for requesting user information in the user management framework (130) in relation to users of this specific company. Such user information may comprise company internal authorization information. Whenever the integrated intranet system needs up-to-date user information, the integrated intranet feeder (120) sends or forwards requests for this user information towards the user management framework (130).

In this example, two exemplary cloud based commercially available user management frameworks (130) are shown, but any other like framework may be applicable as known by a person familiar with the art. Nowadays, a typical organization, such as a company, exploits a single user management framework (130), in which case one of the marked cloud frameworks would be used, but use of multiple frameworks may be applicable. The integrated intranet feeder (120) has only read access towards the organization user management framework (130): the integrated intranet feeder (120) may read or request data from the user management framework (130) for example by polling the organization user management framework (130), sending data requests over any applicable protocol, and thereby receive requested information, but the integrated intranet feeder (120) does not have capability to write into the organization user management framework (130) or initiate any changes thereto. This beneficially simplifies organization internal user management and ensures integrity of user management data, since all user management within the organization may be performed in just one system, namely the organization user management framework (130), and user management information is then read by the integrated intranet system.

End users using integrated intranet web clients (110) have seamless access to external applications (145) provisioned or integrated to the integrated intranet workspace, also called as the Universe® workspace, and integrated intranet clients (110) may be automatically authorized to these workspace integrated applications (145). Selected end user authorization data, such as user identity and authentication keys for example, for all workspace integrated applications is stored in the integrated intranet database (125), so that integrated intranet system may aware of access permissions of all integrated intranet web clients (100). The integrated intranet system preferably stores in the integrated intranet database (125) information identifying the integrated applications (145) for the specific workspace. The integrated intranet database (125) does not, however, store user passwords or temporary authentication data, but these are handled independently by the end user or his/her terminal web browser application or other applicable application providing web access to the user. Passwords may be stored in a web browser application used to access the integrated intranet client (110) as known to a person skilled in the art, so that login to the workspace integrated applications (145) is seamless. When workspace integrated applications are from the same service provider system as the organization user management system, a suitable single sign-on systems may be utilized. Depending on the type and capabilities of the specific application, the integrated intranet client (110) may be authorized as an individual user using personal user credentials, or, when the application is enabled to authorize group type users, as a group user authorized by group credentials.

When any application (145), either a standalone application or an application from any available cloud service framework (140) is integrated to the integrated intranet workspace, it may be called as an integrated application. It should be noticed that although not shown, any cloud service framework (140) typically provide multiple applications (145) which may be individually picked as integrated applications used in any selected workspace, independent on the other applications integrated within the same workspace. A major benefit from the integrated intranet workspace, compared known intranet solutions is that it's not restricted to any single external service provider or service framework (140), but each application (145) may be individually selected from any available service framework (140) or available applications (145) outside any broader service framework. Applications (145) provided from the service framework (140) compliant with the organization user management framework (130) is just one option among the broad selection of applications (145) that may be integrated into the integrated intranet system, but those may be defined as the default applications (145), which will be used unless the user creating the workspace (a.k.a. owner of the workspace) changes the application (145) to a different one.

The integrated intranet web client (110) and the integrated intranet feeder (120) are preferably implemented as one or more computer readable instructions, which are stored in a non-transitory memory and may be uploaded into a non-transitory memory and may then be executed on any kind of computing environment, for example on a node, a server, a virtual server, a software container or an application engine in a cloud computing environment. Among these alternatives, an application engine such as Google App Engine® provides flexibility in view of resourcing, since in this design alternative, the integrated intranet web client (110) and integrated intranet feeder (120) applications are dynamically provided with exactly the resources they need. The integrated intranet web client (110) provides a user interface for the user.

The integrated intranet feeder (120) stores integrated intranet system specific data into an integrated intranet database (125). This data includes for example organization specific user data such as authentication keys, search parameterization data, or other data associated with the organization. The integrated intranet database (125) may comprise for example a SQL database. At least some of the data stored in the integrated intranet database (125) may be accessed also by integrated intranet web clients (110). In addition to user specific data, the integrated intranet database (125) may store for example discussions between the members of an integrated intranet workgroup and postings made by members of the workgroup. This ensures that discussions are available for all members of the workgroup independent from their access towards the integrated applications (145). The integrated intranet database (125) is preferably not used for storing content data for majority of the integrated applications, except for example the above mentioned workspace specific discussions and postings.

If a user joining or participating an integrated intranet workspace does not have access to one or more of the workspace integrated applications due to not having valid user credentials to use a particular independent cloud application selected as a workspace integrated application, this application may not appear to this particular user among the workspace integrated applications. Alternatively, the application may be listed but the user has no access to any integrated intranet workspace data stored in this application. Thus, the integrated intranet workspace may only provide access to part of the integrated intranet applications to a particular user, although the application and related workspace data stored in the application or in a file storage application would be visible to other users within the workspace. In other words, access to the integrated intranet applications and workspace data thereof requires both authorization of the user by the integrated intranet system and authentication by the web client directly towards the application.

The integrated intranet feeder (120) also utilizes a synchronization database (126), which is used for temporarily storing data which is accessible only by the integrated intranet feeder (120). Examples of such data to be stored in the synchronization database (126) is for instance information when a certain action such as polling of user groups from the user management framework (130) has been previously performed.

Figure 2:
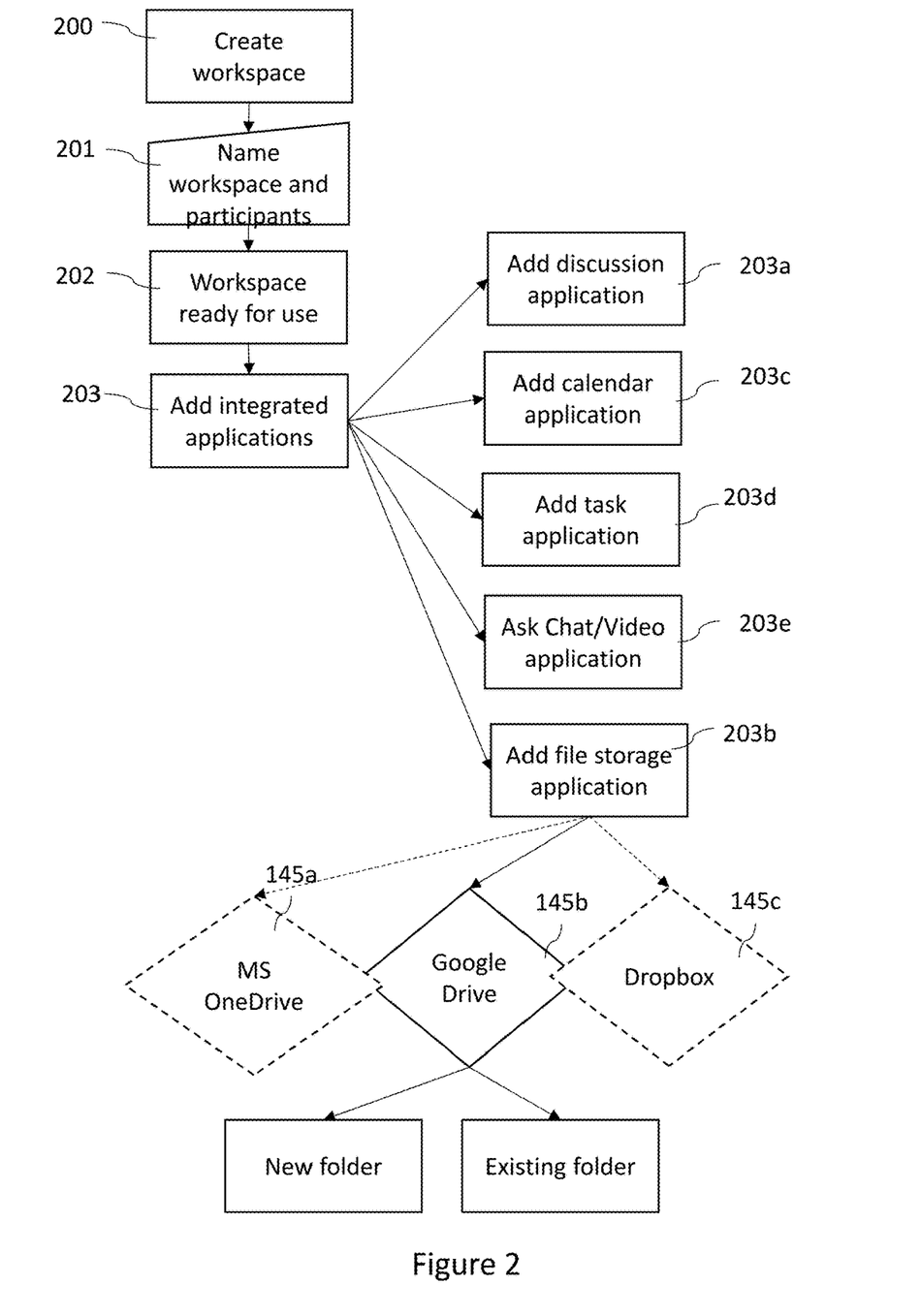
FIG. 2 is a flow chart illustrating creation of a workspace.

FIG. 2 is a simplified flow chart illustrating creation of a new workspace within the integrated intranet system, as seen by a user creating the workspace. The workspace may be created by a user (100) in phase 200, who then defines the name of the workspace and may add one or more participants (users) to the workspace, as illustrated by phase 201. After creating the workspace and naming at least one participant, the workspace is already ready to be used, illustrated by phase 202.

In order to make the workspace useful for the users, one or more service providing applications (145) may be attached (integrated) in phase 203 (as illustrated by 203a, 203b, 203c, 203d, 203e) to the workspace once it has been created, including but not limited to a discussion application, a file storage application, a calendar, a task management application, a chat and a video application. Applications may be integrated in any order, and selection of workspace integrated applications is also freely selectable for each workspace: any of the exemplary application categories may be omitted, or additional application categories may be added, which are not mentioned above. Default applications to be used may be determined by an organization such as a company to which the workspace belongs to, but the integrated intranet system allows selection of individual applications (145) from any suitable service provider and from any available service framework (140), independent of the other applications selected for the specific integrated intranet workspace. Different applications may be added by the user.

Users may have different level of access rights to the workspace. Level of access rights may be represented in the system by a user type. A user with user type "administrator" has full rights to make changes in the workspace environment, and for example to the selection of default applications (145). An "editor" is typically authorized to generate new workspaces and to invite members to these workspaces he/she owns. Administrator users may authorize editors for their role. An editor may be also called an "owner" of a workspace. Normal workspace users may comprise for example "participants", who may have rights to write, to generate new documents, to edit existing documents and so on. A "read only" member may only have read access to the documents and data within the workspace. Users may have different levels of access rights in different workspaces.

As an example of the action of selection of application, FIG. 2 illustrates choosing a file storage and sharing application to be integrated to the integrated intranet workspace. In this example, selection can be made among available cloud based file storage applications, including, but not limited to such known commercial applications as Microsoft OneDrive® (145a), Google Drive® (145b) and Dropbox® (145c). Any one of these may be chosen to be integrated into the created workspace, thus becoming the workspace integrated application (145) for file storage. Existing file folders residing in the selected workspace integrated application (145), in this example Google Drive (145b), which is indicated by the solid arrow from phase 203b towards the selected application (145b), may be made available for the workspace users, and/or new file folders may be created by the authorized users participating the created workspace. Other available options for workspace selected applications, which were not chosen this time, are illustrated by the dashed arrows and diamonds.

The integrated intranet system, especially the integrated intranet feeder (120) and the web client (110), may handle access control management to the external applications for all workspace users, so that access to the selected external applications is seamless for the users. The integrated intranet feeder (120) may provide authorization for the users to their assigned integrated intranet workspaces by providing information on which users are authorized into which workgroups and what is their user type in each respective workgroup. The user type defines user privileges of the users, in other words, level of access rights for applications and application data within the workgroup.

The integrated intranet system or the workspace do not preferably themselves store any user files, but these may be stored by the integrated file storage application. In similar manner, the integrated intranet system does not itself have to store calendar data, task data or chat/video data, but all data may be stored by the respective integrated calendar, task or chat/video application respectively in the cloud computing environment. Integrated intranet database (125) may store authentication keys of the users, and limited application data, such as workspace specific discussions and postings. This enables participation of a user in the workspace discussions even if he/she would not be authorized to use other integrated applications (145) in the workspace. Such situation may occur if a user does not have an account or user identity for an integrated application (145). In such case, the non-authorized integrated applications (145) simply do not appear as available applications in the integrated workspace of this specific user.

Figure 3:
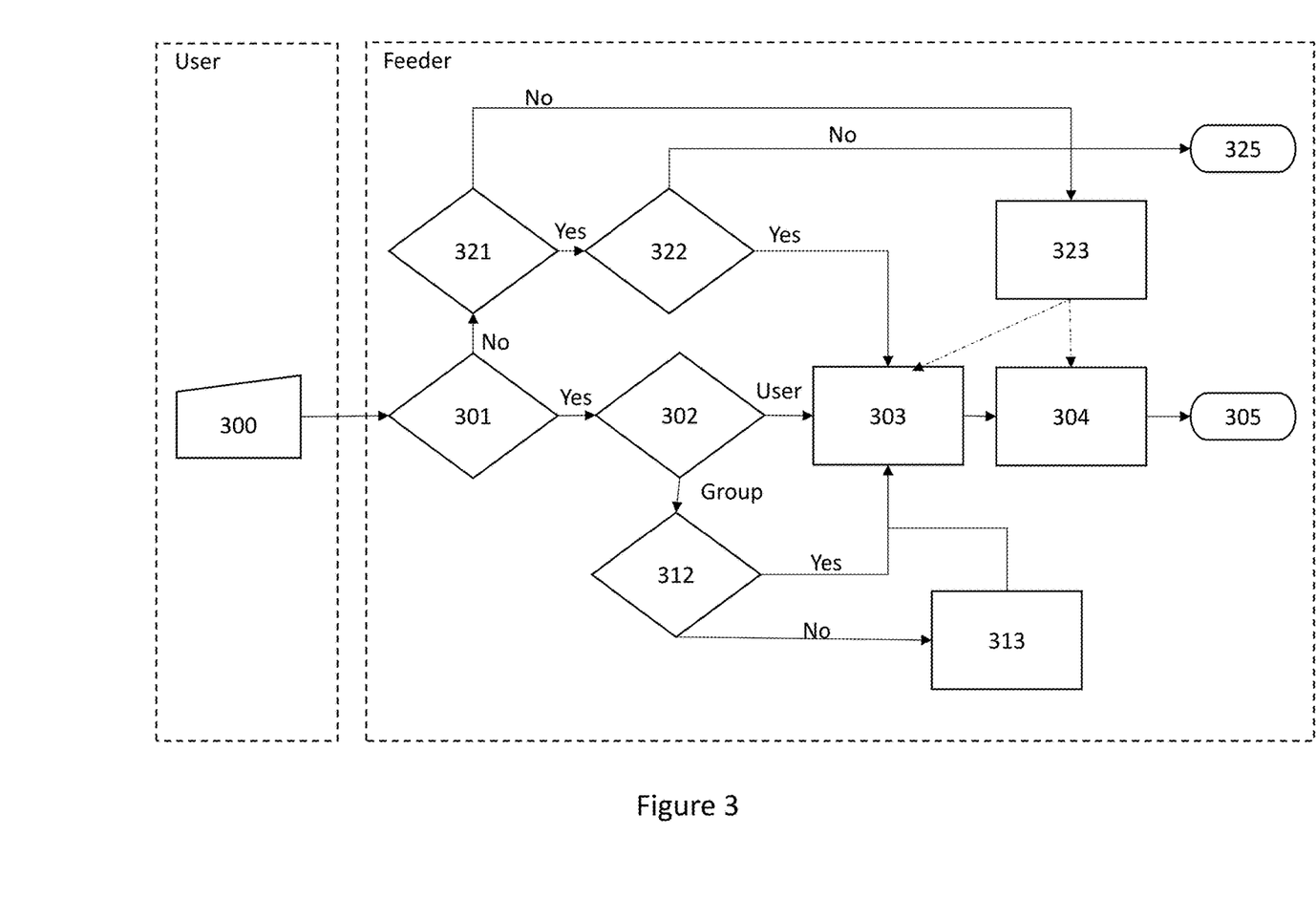
FIG. 3 is a flow chart illustrating adding of a user or group to a workspace.

FIG. 3 is a flow chart illustrating an exemplary process of adding a new user or a new group of users at an existing workspace. For simplicity, we'll use term new user in following description to refer to either an individual or a group, and it's also assumed that the term domain refers for example to an organization internal domain such as a company domain, and any users not within the domain are regarded as external users. Term external domain is then used to refer domain of users who are not within the organization internal domain.

The new user to be added in the integrated intranet system may reside within the domain, or he/she may be an external user residing in an external domain. User email (also for new users) may be used for identifying users in the integrated intranet system, and user's domain, internal or external, may be recognized based on the domain part of the email address of the user. Instead of an email, any other identification may be used in integrated intranet system, but email is a useful option for identifying user identity, as it immediately provides the domain information, and it also provides a simple way to communicate towards the new user. For each workspace, both information on the user identity and the user type (editor, read only etc.) is preferably stored. This enables the same user having different roles in different workspaces. Communication may be needed, for example, to inform the new user that he/she has been included in an integrated intranet workspace.

Process for adding a new user in the workspace occurs under control of the integrated intranet system, and, once initiated by the user in phase 300, the process is run autonomously by the integrated intranet feeder (120), thus appearing as a background process to the user and allowing the existing user (100) who initiates the process of adding the new user to continue working on other matters while the process executes within the integrated intranet system. Integrated intranet feeder (120) functionality carries the main responsibility in running the process. A progress indicator may be provided to the user (100) in the user interface of the integrated intranet client (110) of the user (100) showing that the process is ongoing. For example, a text, a figure, an icon or the like indicating that the new user request is being processed may be visible in the user interface of the user in a user list information field, in a location associated with the new user identification (i.e. new user email). When the new user adding process is ready, the new user appears in the list of workspace users similar to any pre-existing user in the workspace, and the new user is immediately authorized as a fully functional member of the workspace.

Within the integrated intranet feeder (120), after receiving a request from the user (100) to add a new user, identified in this example by the email of the new user, the process of adding the new user begins with checking in phase 301 whether the new user is resident within the domain. This information may be obtained by checking the domain part of the email address of the new user, or by comparing the entire email address of the new user to a list of emails in the organization domain that is already stored in the integrated intranet database (125). If the new user is within the organization domain and the organization is using integrated intranet for all employees, the user already exists in the integrated intranet database (125), and is found with a narrow search among the user data relating to the users residing within the domain of the organization.

According to an embodiment, a request to add a new user only comprises identity of the new user. A default user type may be automatically given to all new users when added among the users of the workgroup. The default user type of a new user may be configured to be adjustable by an administrator. For example, a new user may be added into a workspace with participant user type. The user type may then be promoted for example to an editor on an owner by an existing user (100) who has a user type authorized to make changes to users. Alternatively, a new user may be demoted for example to read only user type. In another example, any new member added by an existing member may initially have a read only user type, and the user type may then be promoted by a pre-existing user with sufficient authorization. A person creating a new workspace may preferably have owner user type to begin with. An owner may have rights to select the workspace integrated applications, add and remove members from the workspace and change user type of other workspace members. According to an alternative embodiment, the request for adding a new user comprises initial user type for the new user.

When a user identity exists as a user in the integrated intranet system, and the email or other identification of the user is stored in the integrated intranet database (125). An email address identifies the user and the domain he/she resides in. Additional user information may be stored in the integrated intranet database (125), but preferably only if such additional user information is not available in the user management network (130). If some user information is readily available in the user management network (130), it is only stored in the user management framework (130) and not copied in the integrated intranet database (125). This enables minimizing the amount of data stored in the integrated intranet database (125), but also ensures that no conflicting versions of the same data appears in different places. A preferable additional user information to be stored in the integrated intranet database is user type. An example of additional user information which could be stored in the integrated intranet database (125) is data on skills of the user. This type of information is not typically available in a user management network (130). Some of the additional user information stored within the integrated intranet database (125) may be visible to other integrated intranet users (100) or to other workspace users authorized to access the same workspace, and some information may be invisible to other users.

If the new user is within the domain, it's checked in phase 302 whether the new user is an individual or a group. If the new user is an individual, the workspace may be directly shared with the new user in phase 303, and the process continues to sharing the workspace integrated applications within the workspace in phase 304. This sharing of the workspace integrated applications is performed in capability of a workspace owner by the integrated intranet feeder (120). When the workspace and the workspace integrated applications therein have been successfully shared for the new user, the user (100) may be notified in phase 305, by indicating in the user interface and/or by sending a message to the user that the workspace is ready to be used by the new user. For example, an email message may be sent to the user confirming the successful addition of the new user, and also the new user may be provided with an email or any other applicable message indicating his/her new membership in the workspace. Also, the progress indicator that was shown to the user (100) in the user interface of the integrated intranet client (110) of the user (100) is removed, and the new user appears now in the list of workspace participants among other, earlier added participants (users). Addition of the new user preferably comprises storing identity of the new user in the integrated intranet database (125) among the users of the specific workspace.

Depending on the selected workspace integrated applications, the authentication process varies. When the integrated application belongs to the same framework with the user management framework (130), the integrated intranet feeder (120) may impersonate the new user and perform authentication of the user in the integrated application, so that it's readily available for the user when he/she opens the workspace. If an integrated application (145) is used in the workspace which belongs to some other authentication framework (140), or is an individual application (145) provided in the cloud computing environment, the new user may have to manually login to the integrated application when using it for the first time from the integrated intranet workspace. After the first login, during which the new user may be required to provide acceptance for conditions of using the service, the new user is automatically logged in to the integrated application when using the integrated intranet client (110) using a single sign-on process as known in the art.

It may happen sometimes, that a user participating the integrated intranet workspace has user credentials for an integrated application under a different user identity than the identity used in the integrated intranet. In this case, the alternative user name may be stored in the integrated intranet user data in the integrated intranet database (125), and this alternative user name may be utilized for accessing an integrated application instead of the user identification used within the integrated intranet. The integrated intranet system then uses the primary login information for authenticating the user for the workspace, and secondary integrated application authentication to retrieve data from the integrated application. Similarly, if a $3^{rd}$ party integrated application is selected that uses different identity than the integrated intranet, the integrated intranet system then uses the primary login information for authenticating the user for the workspace, and secondary integrated application authentication to retrieve data from the integrated 3$^{rd}$ party application If the new user would be found to be a group in phase 302, compatibility of workspace integrated applications (145) for group use is next checked by the integrated intranet feeder (120) in phase 312. In case any of the workspace integrated applications (145) would not be compatible with group type users, the group is expanded to individual users for workspace integrated application sharing for such integrated application (145) in phase 313, and the respective integrated application (145) is then shared separately to all individual users (100) within the group as if the request to add the individual users (100) was made for each one separately. If an integrated application (145) is compliant with group type users, the process proceeds to sharing the workspace (phase 303) without expanding the group, sharing of such workspace integrated application (phase 304) and notifying the user (100) and the new user(s) in phase 305 in similar manner as described above in connection with an individual user. When the new user is added from within the domain, he/she may be authenticated for the workspace integrated applications by the integrated intranet feeder (120) based on authentication information stored in the user management framework (130).

If the narrow search in phase 301 within the users residing in the domain of the organization would indicate that new user is not to be within the domain, a broader search is performed in phase 321 among all integrated intranet user data stored in the integrated intranet database (125) for this organization, for checking whether the new user is already known as an external user of the integrated intranet system. External users may be stored in the integrated intranet system in a special group of users, which may be referred to as an "external user group", and once a user has once used the integrated intranet system, his/her identity may be found from such external users group, and his/her basic information is available in the integrated intranet database (125) for other workgroups within the same domain. If the user information already exists in integrated intranet database (125), it's next checked in phase 322 whether the new user is an individual person, or if the new user identifier actually refers to a group. In this example, addition of an external individual is allowed, the user is in the integrated intranet (phase 321), and the checking phase 322 indicates that the new user is an individual person, the process proceeds directly to sharing the workspace (phase 303), sharing the workspace integrated applications (phase 304) to the new user, and notifying the user and the new user (phase 305) that the new user has been added into the integrated intranet workspace. External users may only have access to the specific workspace and workspace related data they were authorized to. The new user coming from an external domain may be authenticated for the workspace integrated applications by the integrated intranet feeder, using user credentials he/she already has for the authentication framework (140) or for the integrated intranet application (145). If the new user does not have user identity and credentials within the authentication framework (140) or for an integrated intranet application (145) used within this workgroup, the new user has no visibility to these services in the workspace either. In minimum configuration, the new user may have visibility only to limited application data, such as discussions and postings if those are stored at the integrated intranet database (125). If the new user acquires access rights towards the authentication framework (140) and/or integrated applications (145) used by the workgroup, these services will appear to the workgroup integrated intranet workspace after the user has logged in to these services. After this, the applications may be made available through a single sign-on authentication.

If the checking in phase 322 would indicate that the new, external user would actually be a group, not an individual, the system may deny access to the integrated intranet workspace, and notify the user (100) in phase 325 that it's not possible to share the workspace with an external group, but sharing should be made individually instead. A limitation in sharing the integrated intranet workspace with external groups is a security measure. An external group may be changed from outside the domain, and thus control of actual users sharing the integrated intranet workspace would be lost if an external group was allowed. Further, group information may include for example confidential information which should not be shared outside an organization, and adding a group in the integrated intranet system would reveal this information to other integrated intranet users (100), including external users.

Returning to the checking in phase 321, if the new, external user would not already exist in the integrated intranet, a new integrated intranet user may be created by the integrated intranet feeder (120) in phase 323. Creating a new user means that a user identification, such as an email address, is added in the integrated intranet database (125) by the integrated intranet feeder (120) as a workgroup member. The new user may be authenticated for the workspace integrated applications with single sign-on after the terms have been accepted and user credentials have been provided for the workspace applications by the new user for the first time. After successfully creating the new user in the integrated intranet system, the workspace may be shared to the new user in phase 304.

Some integrated intranet applications and workspaces may even allow using alternative authentication for access. For instance, a workgroup and discussions therein may be accessed with a third party authentication. An example of such third party authentication may be a Facebook® authentication.

In some circumstances the integrated intranet workspace may not be shared, although a new user was added to the integrated intranet system in phase 323. In example, if the organization, represented by the administrator users, has not given a permit to allow a specific user or a user from a specific domain to participate in an integrated intranet workgroup, or the user is from an organization who doesn't have a license to use integrated intranet system. In such case, it's still possible to share the workspace integrated applications one by one to such external user. This is illustrated with the dashed arrow between phases 323 and 304, which is an alternative option for the route through phases 323 and 303, also marked with dashed line to illustrate optionality. The integrated intranet feeder (120) may still share at least some of the workspace integrated applications separately to any user. When workspace application sharing is completed, the user (100) may be informed with a message in phase 305 of the outcome of the process as described above. Also the new user may be informed with a message in phase 305 about availability of the new integrated intranet workspace.

Figure 4:
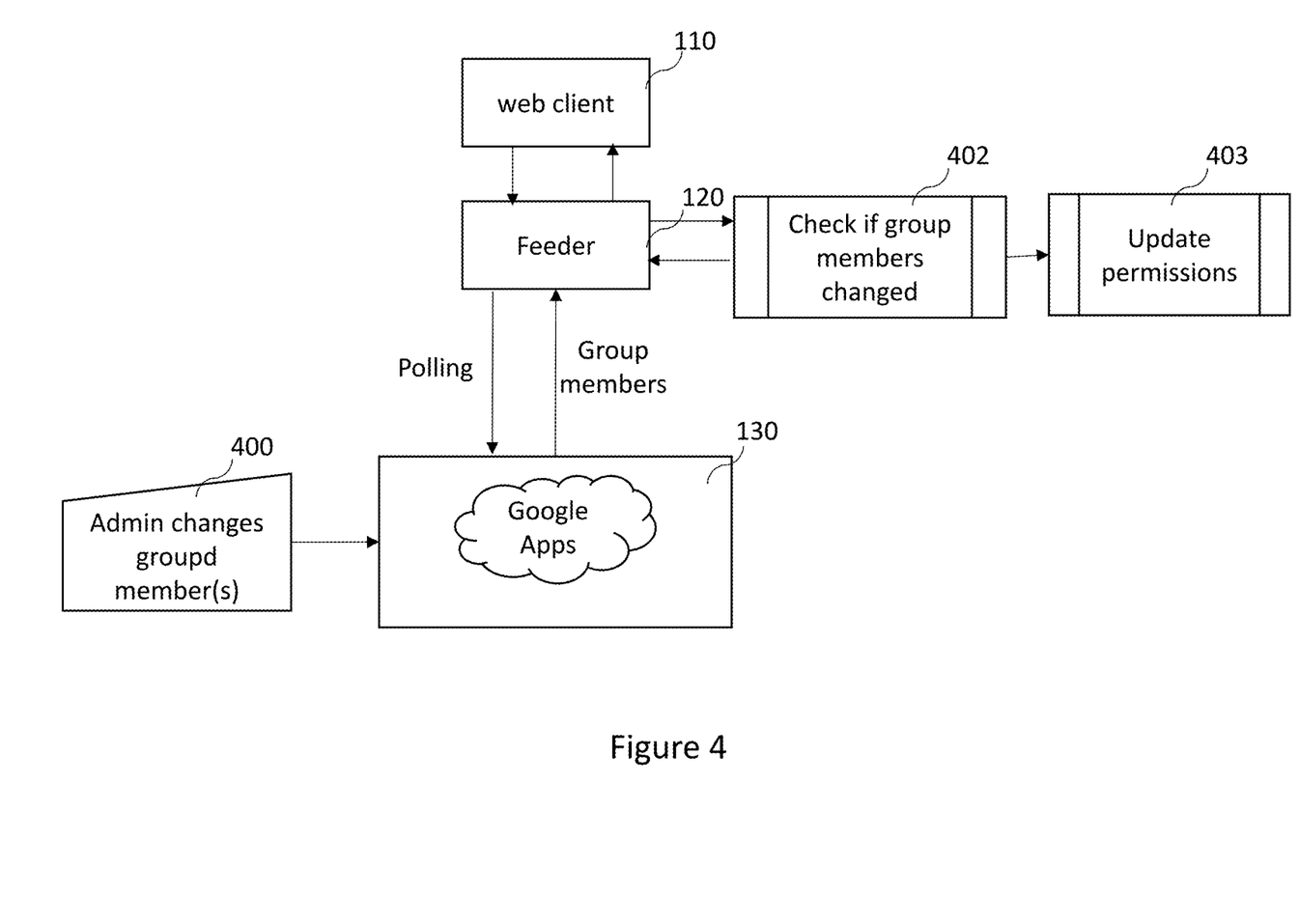
FIG. 4 illustrates reflection of permission changes in provisioning service.

FIG. 4 illustrates a process for reflecting permission changes in the workspace integrated applications. This kind of situation may occur for example if changes are made (phase 400) by a system administrator responsible for the user management framework (130) within the organization to authorization of a user that is a member of a group using a shared integrated intranet workspace. In this example, the administrator makes a change in phase 400 in group member data in Google Apps® environment used as the user management framework (130) within the organization. Alternatively, changes may be made in any used user management framework (130), as described in connection to FIG. 1. Examples of situations where a user is removed or added from an integrated intranet workspace could be that a person changes his/her job within the organization, moves to another project, joins another workgroup, or leaves the organization. On the other hand, it's possible that permissions of an existing user need to be changed for instance due to change of role of the person in a project or a workgroup. In order to detect changes in persons or their permissions, the integrated intranet feeder regularly polls user data within the user management framework (130). Regularly indicates that polling occurs at regular intervals. The time period between consecutive polls may be defined depending for example on update frequency of the user management framework (130) and adjusted if needed. When receiving information on group members received from the user management framework (130), the integrated intranet feeder (120) may compare the information on existing integrated intranet information stored in the integrated intranet database (125) in phase 402 in order to find changes in any user information. In an alternative embodiment, the updated information simply replaces the pre-existing information after each poll. If any permissions concerning one or more users has been changed, user data stored in the integrated intranet database (125) becomes updated for the respective users in phase 403 without duplicated manual administration work. Beneficially, permissions in the integrated intranet are thus updated automatically based on changes made in the user management framework (130), and no duplicate administration work is required for maintaining access rights in the integrated intranet coherent with those of the user management framework (130). Phase 402 may also include expanding a group into individual integrated intranet users, if an integrated application (145) used in any integrated intranet workspace the updated group participates would not support use of group type users. In such case, permissions of any individual user (100) within the group are individually updated for the respective integrated application (145).

Figure 5:
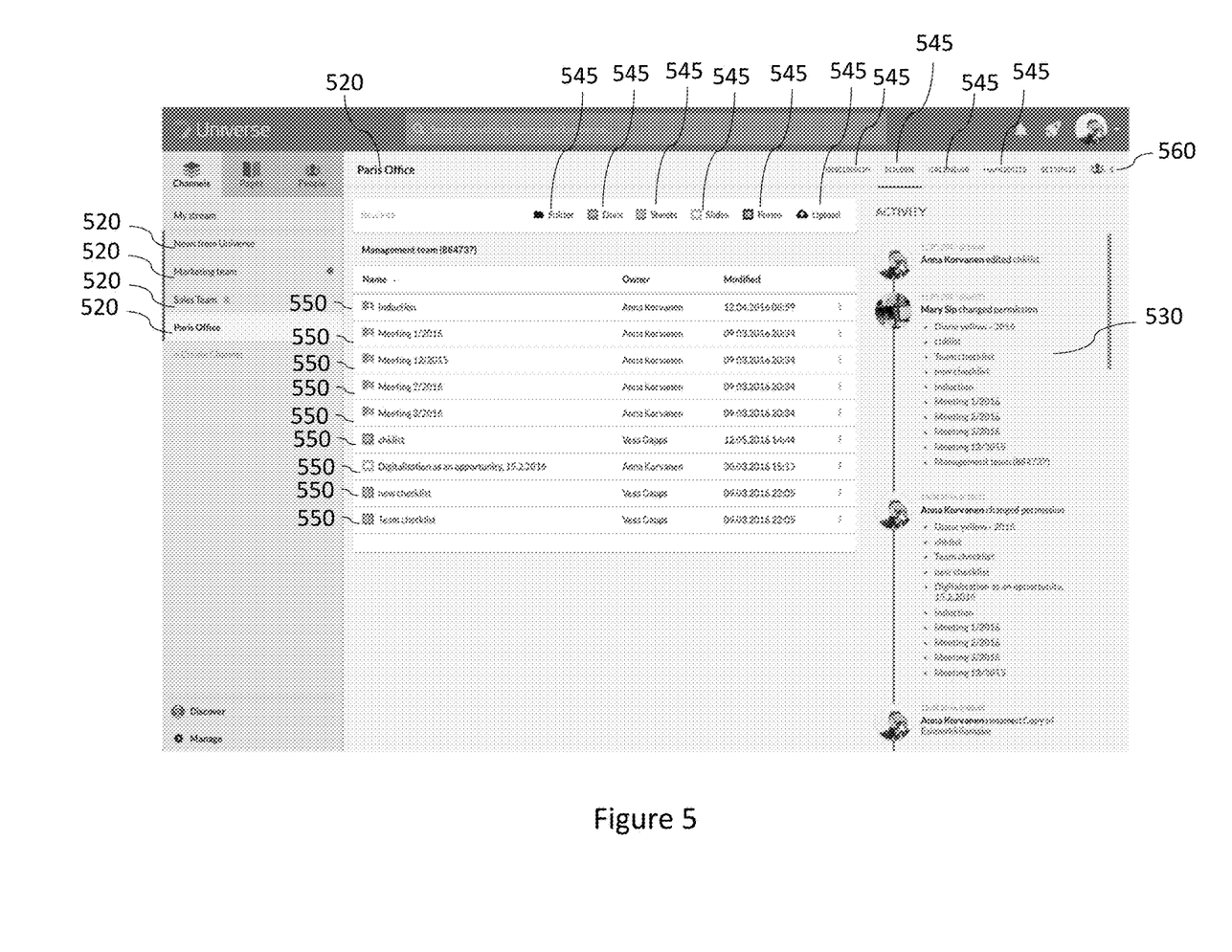
FIG. 5 illustrates a view of a user interface of an integrated intranet workspace.

FIG. 5 illustrates an exemplary view in a user interface provided to a user of an integrated intranet workspace. The view shown may be preferably provided by a web client (110). Name of the currently active workspace (520*a*), here named as "channel", is indicated on the page. A list of further available workspaces (channels) (520), into which this particular user has access to, is provided in this view. This list also works as links for the user so that he/she can easily switch between different workspaces by simply selecting one from this list. The view also comprises application links or shortcuts (545) providing direct access to workspace integrated applications (145*a*, 145*b*, . . . ) for this specific workspace. Visual representation of the application links may be configured in various ways. As indicated above, workspace related data for these applications is primarily stored in the cloud computing environment and made accessible towards the users (100) authorized to access this workspace. The main view shown in this example shows various application documents (550) generated with different workspace integrated applications, which are preferably stored in a file storage application in the could computing environment and appear in this user interface view as residing in a common, shared workspace folder. This workspace folder may comprise a file storage application folder in the cloud computing environment, and naturally it may comprise sub-folders. An activity pane (520) shows recent activity by members of the current integrated intranet workspace. An icon (560) providing access towards list of users is in this example associated with a number indicating how many members there are in this workspace. Alternatively, some other form of link or shortcut may be configured to give access towards the list of users. In this example, this workspace has five members. By clicking this icon, a view on the members is opened, which is illustrated in FIG. 6.

Figure 6:
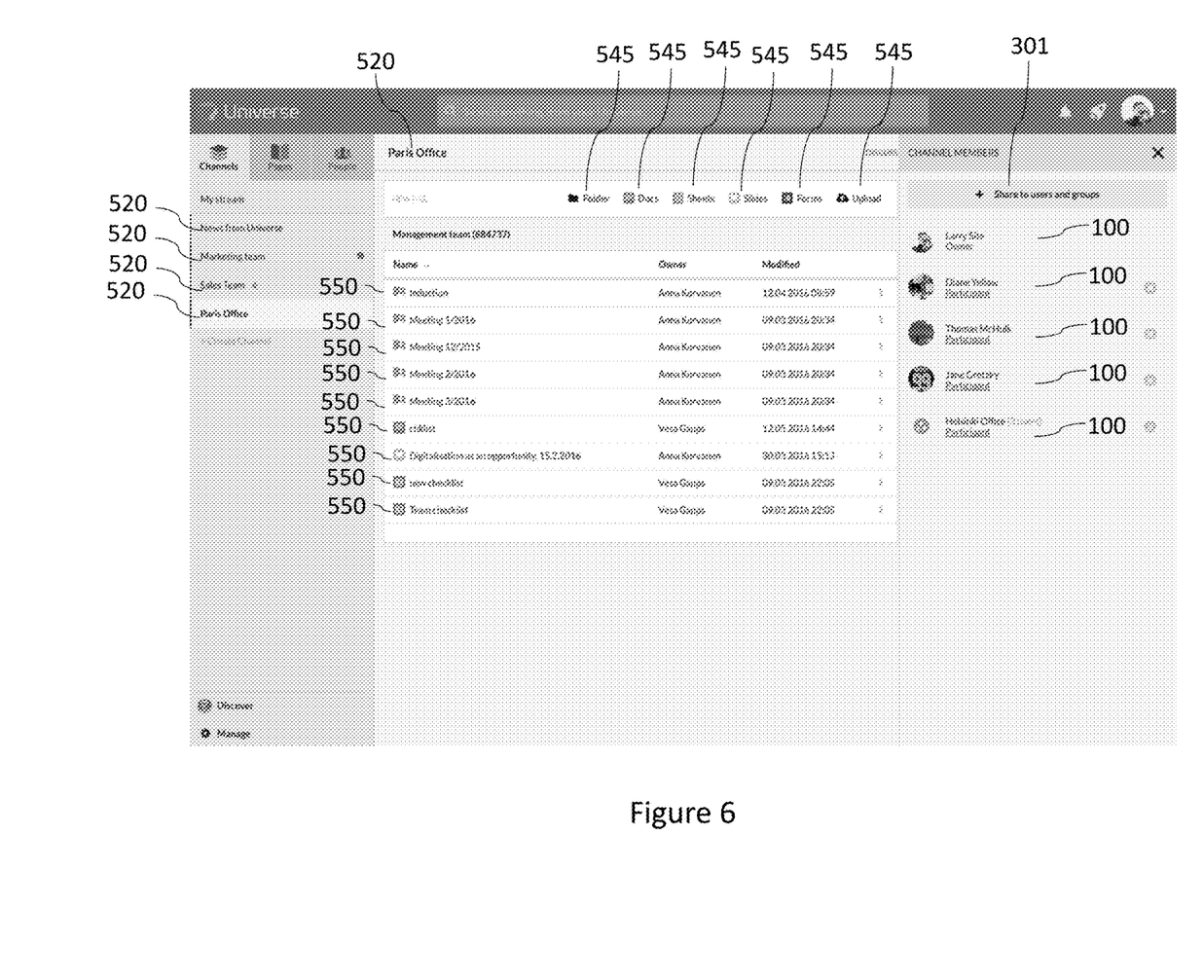
FIG. 6 illustrates another view of a user interface of an integrated intranet workspace.

FIG. 6 illustrates another exemplary view in a user interface of an integrated intranet workspace. Users (100) of this workspace are now shown as a list in a window, and their user type is also shown in the listing below their names. By clicking link "Share to users and groups" (301), the user may initiate the process of adding a new user or a new group of users in this workspace as illustrated above in relation to FIG. 3. The integrated intranet user interface is configured to enable initiating the process of adding a new user. A new user may be initially added with a default user type, which may be a participant or for example read only. This default user type may then be changed by a user within the workspace who is authorized to do so. A user may be promoted, for example, to an editor or an owner.

Figure 7:
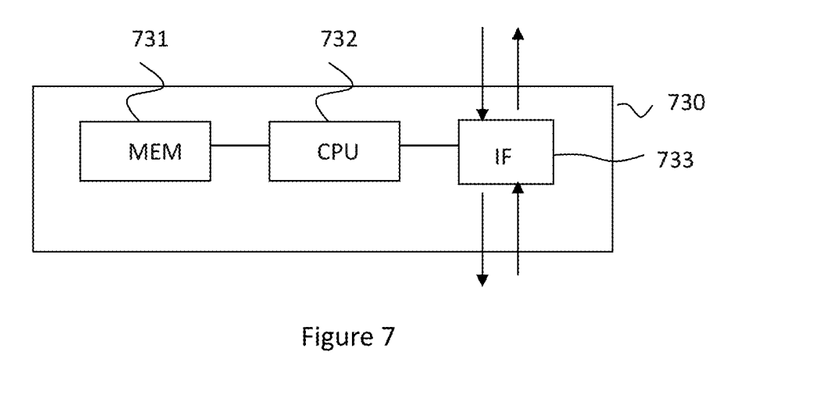
FIG. 7 illustrates an exemplary hardware structure for an integrated intranet feeder.

FIG. 7 illustrates an example of a processing device suitable to execute program code and performing tasks of an integrated intranet feeder device (120) and/or an integrated intranet client device (110). Such processing device may be a server device, computer or like running an integrated intranet feeder application and/or an integrated intranet client application. The node device 730 comprises at least one memory (MEM) 731, for storing executable program code relating to integrated intranet functionalities. The memory 831 may comprise volatile and/or non-volatile memory, for example EEPROM, ROM, PROM, RAM, DRAM, SRAM, firmware, programmable logic, etc. The node device 730 further comprises one or more processor units (CPU) 732, for processing the instructions and running computer programs and an interface unit (IF) 733, for sending and receiving messages and data.

The integrated intranet database (125) may be comprised within a node, or it may be a separate database capable of communicating with a node, the database comprising volatile and/or non-volatile memory for storing the user data used for the integrated intranet system as described above.

It is apparent to a person skilled in the art that as technology advanced, the basic idea of the invention can be implemented in various ways. The invention and its embodiments are therefore not restricted to the above examples, but they may vary within the scope of the claims.

The invention claimed is:

1. A method for providing an integrated intranet workspace, the method comprising:
   including one or more independent applications as workspace integrated applications for providing services for a workgroup of an organization within the integrated intranet workspace, wherein the independent applications reside in a cloud computing environment;
   authorizing one or more users into a defined set of users authorized to access the integrated intranet workspace; and
   providing, for each user in the defined set of users, an integrated intranet web client for providing a user interface with a combined view into at least part of the workspace integrated applications;
   wherein each integrated intranet web client is configured to manage authentication of a user among the defined set of users to the at least part of the workspace integrated applications, wherein the method further comprises:
- receiving, from the user among the defined set of users, a request to add a new user into the defined set of users authorized to access the integrated intranet workspace, wherein the request includes at least an identifier of the new user;
- performing, by an integrated intranet feeder, a process for determining whether the new user may be added into the defined set of users, wherein the process comprises:
  - performing a first search in an integrated intranet database for detecting whether the identifier of the new user indicates that the new user resides within a domain of the organization from an organization user management framework and whether integrated intranet data of the new user is already stored in the integrated intranet database;
  - when the first search indicates that the new user resides within the domain of the organization and that the identifier of the new user is already stored in the integrated intranet database, detecting that the new user represents a group of users;
  - checking whether the workspace integrated applications are capable of accepting a group type user;
  - when any of the workspace integrated applications are not capable of accepting a croup type user, expanding the croup of users into a number of individual new users corresponding to participants of the group of users;
  - authorizing the number of individual new users to access the integrated intranet workspace by storing identifiers of the number of individual users of the group of users among the identifiers of the defined set of users;
  - sharing the integrated intranet workspace with each of the number of individual new users;
  - sharing the at least part of the workspace integrated applications with each of the number of individual new users;
  - informing the user that the new user was added, and
  - sending messages informing each of the number of individual new users about availability of the integrated intranet workspace.

2. The method according to claim 1, the method further comprising:
- obtaining, by the integrated intranet feeder, integrated intranet user information related to users residing within the domain of the organization from an organization user management framework;
- storing the integrated intranet user information in an integrated intranet database associated with the integrated intranet feeder; and
- providing at least part of the integrated intranet user information to the integrated intranet web client for each of the one or more users,
- wherein the integrated intranet user information is configured to authorize the integrated intranet web clients to access the integrated intranet workspace.

3. The method according to claim 1, wherein the including of the workspace integrated applications is based on a selection made by an integrated intranet workspace user.

4. The method according to claim 1, the method further comprising:
- when the first search indicates that the new user resides within the domain of the organization and that the identifier of the new user is already stored in the integrated intranet database, detecting that the new user represents an individual;
- authorizing the new user to access the integrated intranet workspace by adding the new user into the defined set of users, and by storing the identifier of the new user among identifiers of the defined set of users,
- informing the user that the new user was added, and
- sending a message informing the new user about availability of the integrated intranet workspace.

5. The method according to claim 4, wherein the method further comprises:
- authorizing the new user to access the integrated intranet workspace;
- sharing the integrated intranet workspace for the new user; and
- sharing at least part of the workspace integrated applications to the new user.

6. The method according to claim 4, wherein the process for determining further comprises:
- performing a second search among user data of all integrated intranet users within the integrated intranet database when the first search indicates that the new user does not reside within the domain of the organization, wherein the second search is (brought down from preceding line) for checking whether an identifier of the new user is found in the integrated intranet data stored in the integrated intranet database;
- storing the identifier of the new user among identifiers of the defined set of users in the integrated intranet database when the new user is not found in the integrated intranet database; and
- performing at least one of:
  - sharing the integrated intranet workspace for the new user; and
  - sharing the at least part of workspace integrated applications to the new user.

7. The method according to claim 6, the method further comprising:
- detecting that the new user is outside the domain of the organization and comprises a group of users;
- not adding identity of the new user in the integrated intranet database; and
- sending a notification to the user that an external group of users may not be added into the integrated intranet workgroup as a group user.

8. The method according to claim 2, the method further comprising:
- regularly polling from the organization user management framework, by the integrated intranet feeder, user information related to users residing within the domain of the organization;
- comparing the polled user information to the integrated intranet user information stored in the integrated intranet database; and
- updating the integrated intranet user information in the integrated intranet database whenever the polled user information is deemed to have changed.

9. The method according to claim 1, wherein application data for at least part of the workspace integrated applications for the workgroup is only stored in the cloud computing environment.

10. A system accessible by a computing device, the system comprising:
- an integrated intranet feeder configured to obtain integrated intranet user information related to users residing within a domain of an organization from an organization user management framework; and at least one of a node, a server, a virtual server, a software container and an application engine in a cloud computing environment comprising memory and a processor configured to provide an integrated intranet workspace comprising:

one or more independent applications selected as workspace integrated applications for providing services for a workgroup of the organization within the integrated intranet workspace to one or more users making up a defined set of users authorized to access the integrated intranet workspace, wherein the independent applications provide the services in a cloud computing environment; and at least one integrated intranet web client configured to provide a combined view into at least part of the workspace integrated applications for each user from among the defined set of users; and wherein each integrated intranet web client is configured to manage authentication of a user among the defined set of users to the at least part of the workspace integrated applications, wherein the integrated intranet feeder is further configured:

to receive, from the user among the defined set of users, a request to add a new user into the defined set of users authorized to access the integrated intranet workspace, wherein the request includes at least an identifier of the new user; and to perform a process for determining whether the new user may be added into the defined set of users, wherein the intranet feeder is further configured:

to perform a first search in an integrated intranet database for detecting whether the identifier of the new user indicates that the new user resides within the domain of the organization and whether integrated intranet data of the new user is already stored in the integrated intranet database;

when the first search indicates that the new user resides within the domain of the organization and that the identifier of the new user is already stored in the integrated intranet database, to detect that the new user represents a group of users;

to check whether the workspace integrated applications are capable of accepting a group type user;

when any of the workspace integrated applications are not capable of accepting a group type user, to expand the group of users into a number of individual new users corresponding to participants of the group of users;

to authorize the number of individual new users to access the integrated intranet workspace by storing identifiers of the number of individual users of the group of users among the identifiers of the defined set of users;

to share the integrated intranet workspace with each of the number of individual new users;

to share the at least part of the workspace integrated applications with each of the number of individual new users;

to inform the user that the new user was added; and to send messages informing each of the number of individual new users about availability of the integrated intranet workspace.

11. The system according to claim 10, the system further comprising:

wherein the integrated intranet database is associated with the integrated intranet feeder, and the integrated intranet database is configured for storing the integrated intranet user information;

wherein the integrated intranet feeder is further configured to provide at least part of the integrated intranet user information to the integrated intranet web client for each of the one or more users, and wherein the integrated intranet user information is configured to authorize the integrated intranet web clients to access the integrated intranet workspace.

12. The system according to claim 10, wherein the workspace integrated applications are configured to be selected by an integrated intranet workspace user.

13. The system according to claim 10, wherein the integrated intranet feeder is further configured:

when the first search indicates that the new user resides within the domain of the organization and that the identifier of the new user is already stored in the integrated intranet database, to detect that the new user represents an individual;

to authorize the new user to access the integrated intranet workspace by adding the new user into the defined set of users by storing the identifier of the new user among identifiers of the defined set of users, inform the user that the new user was added, and to send a message informing the new user about availability of the integrated intranet workspace.

14. The system according to claim 13, wherein the integrated intranet feeder is further configured:

to authorize the new user to access the integrated intranet workspace;

to share the integrated intranet workspace for the new user; and to share at least part of the workspace integrated applications to the new user.

15. The system according to claim 10, wherein the integrated intranet feeder is further configured:

to detect that the new user is outside of the domain of the organization and comprises a group of users;

to not add identity of the new user in the integrated intranet database; and to send a notification to the user that an external group of users may not be added into the integrated intranet workgroup as a group user.

16. The system according to claim 11 wherein the integrated intranet feeder is further configured:

to regularly poll from the organization user management framework for user information related to users residing within the domain of the organization;

to compare the polled user information to the integrated intranet user information stored in the integrated intranet database; and to update the integrated intranet user information in the integrated intranet database whenever the polled user information is deemed to have changed.

17. The system according to claim 10, wherein application data for at least part of the workspace integrated applications for the workgroup is configured to be only stored in the cloud computing environment.

18. A non-transitory computer-readable memory containing computer readable instructions which, when executed by at least one data processor, cause a computer device to perform the method of comprising:

including one or more independent applications as workspace integrated applications for providing services for a workgroup of an organization within the integrated intranet workspace, wherein the independent applications reside in a cloud computing environment;

authorizing one or more users into a defined set of users authorized to access the integrated intranet workspace; and providing, for each user in the defined set of users, an integrated intranet web client for providing a user interface with a combined view into at least part of the workspace integrated applications;

wherein each integrated intranet web client is configured to manage authentication of a user among the defined set of users to the at least part of the workspace integrated applications, wherein the method further comprises:

receiving, from the user among the defined set of users, a request to add a new user into the defined set of users authorized to access the integrated intranet workspace, wherein the request includes at least an identifier of the new user;

performing, by an integrated intranet feeder, a process for determining whether the new user may be added into the defined set of users, wherein the process comprises:

performing a first search in an integrated intranet database for detecting whether the identifier of the new user indicates that the new user resides within a domain of the organization from an organization user management framework and whether integrated intranet data of the new user is already stored in the integrated intranet database;

when the first search indicates that the new user resides within the domain of the organization and that the identifier of the new user is already stored in the integrated intranet database, detecting that the new user represents a group of users;

checking whether the workspace integrated applications are capable of accepting a group type user;

when any of the workspace integrated applications are not capable of accepting a group type user, expanding the group of users into a number of individual new users corresponding to participants of the group of users;

authorizing the number of individual new users to access the integrated intranet workspace by storing identifiers of the number of individual users of the group of users among the identifiers of the defined set of users;

sharing the integrated intranet workspace with each of the number of individual new users;

sharing the at least part of the workspace integrated applications with each of the number of individual new users;

informing the user that the new user was added, and sending messages informing each of the number of individual new users about availability of the integrated intranet workspace.

* * * * *